US012745034B2

(12) United States Patent
Tsai

(10) Patent No.: US 12,745,034 B2
(45) Date of Patent: Sep. 22, 2026

(54) ELECTRONIC DEVICE AND DAMPER

(71) Applicants: MICRO-STAR INT'L CO., LTD., New Taipei City (TW); MSI ELECTRONIC (KUN SHAN) CO., LTD, Suzhou City (CN)

(72) Inventor: Wang Ting Tsai, New Taipei City (TW)

(73) Assignees: MICRO-STAR INT'L CO., LTD., New Taipei City (TW); MSI ELECTRONIC (KUN SHAN) CO., LTD, Suzhou City (CN)

( * ) Notice: Subject to any disclaimer, the term of this patent is extended or adjusted under 35 U.S.C. 154(b) by 115 days.

(21) Appl. No.: 18/915,001

(22) Filed: Oct. 14, 2024

(65) Prior Publication Data

US 2026/0075355 A1 Mar. 12, 2026

(30) Foreign Application Priority Data

Sep. 12, 2024 (TW) ................................ 113134705

(51) Int. Cl.

*H04R 1/28* (2006.01)
*H04R 1/02* (2006.01)
*H04R 5/02* (2006.01)

(52) U.S. Cl.

CPC .......... *H04R 1/2811* (2013.01); *H04R 1/025* (2013.01); *H04R 1/288* (2013.01); *H04R 5/02* (2013.01); *H04R 2499/11* (2013.01); *H04R 2499/15* (2013.01)

(58) Field of Classification Search

CPC .......... H04R 1/025; H04R 1/288; H04R 5/02; H04R 1/2811; H04R 2499/15; H04M 1/03

See application file for complete search history.

(56) References Cited

U.S. PATENT DOCUMENTS

| | | | | |
|---|---|---|---|---|
| 5,263,093 A * | 11/1993 | Nakamura | H04R 1/08 | 381/357 |
| 5,689,574 A * | 11/1997 | Heirich | G06F 1/1605 | 381/345 |
| 6,526,150 B2 * | 2/2003 | Kelly | H04M 1/03 | 381/345 |
| 2008/0031485 A1 * | 2/2008 | Yu | H04R 1/025 | 381/386 |

* cited by examiner

*Primary Examiner* — Huyen D Le
(74) *Attorney, Agent, or Firm* — Maschoff Brennan

(57) ABSTRACT

An electronic device includes a casing, a speaker and a damper. The casing has two assembling protrusions. The casing surrounds and forms an accommodating space. The assembling protrusions are located opposite to each other, and are located in the accommodating space. The speaker is located in the accommodating space. The speaker includes a vibrating portion and an assembling portion. The assembling portion is connected to the vibrating portion. The damper includes two damping portions and a connecting portion. Each damping portion has an inner curved surface. The inner curved surface surrounds and forms a damping space. Two opposite ends of the connecting portion are connected to the two damping portions. The connecting portion is mounted on the assembling portion. The vibrating portion is spaced apart from the casing via the damping portions mounted on the assembling protrusions and via the assembling protrusions located in the damping spaces.

10 Claims, 7 Drawing Sheets

ELECTRONIC DEVICE AND DAMPER

CROSS-REFERENCE TO RELATED APPLICATIONS

This non-provisional application claims priority under 35 U.S. C. § 119(a) on Patent Application No(s). 113134705 filed in Taiwan, R.O.C. on Sep. 12, 2024, the entire contents of which are hereby incorporated by reference.

TECHNICAL FIELD

The present disclosure relates to an electronic device and a damper, more particularly to an electronic device and a damper having a damping space.

BACKGROUND

Recently, the application of a laptop has become more and more popular. With the continuous advancement of technology, in addition to computing and processing performance, the laptop has developed to provide various functions via other peripheral devices or built-in electronic components. For example, an audio performance of the laptop is gradually emphasized. Therefore, a speaker becomes an indispensable and important device in the laptop.

The speaker is usually built in the laptop so as to enhance portability. On the other hand, the laptop is gradually becoming lighter and thinner, so that a space inside the laptop becomes limited. When the speaker is operating in a limited space of the laptop, if the speaker is not effectively damped, the speaker may resonate with a casing and a keyboard of the laptop and generates noise with the casing and the keyboard during operation. Thus, the performance of the speaker playing the audio can be affected. Generally, manufacturers may install a damper on the speaker to absorb the vibration generated by the speaker. However, a damping performance of the conventional damper to the speaker is still insufficient. Therefore, how to improve the damping performance of the damper to the speaker is one of the key issues that researchers need to address.

SUMMARY

The present disclosure provides an electronic device and a damper so as to improve the damping performance of the damper to the speaker One embodiment of the present disclosure provides an electronic device including a casing, a speaker and at least one damper. The casing has at least two assembling protrusions. The casing surrounds and forms an accommodating space. The at least two assembling protrusions are located opposite to each other, and are located in the accommodating space. The speaker is located in the accommodating space. The speaker includes a vibrating portion and at least one assembling portion. The at least one assembling portion is connected to the vibrating portion. The at least one damper includes two damping portions and a connecting portion. Each of the two damping portions has an inner curved surface. The inner curved surface surrounds and forms a damping space. Two opposite ends of the connecting portion are connected to the two damping portions. The connecting portion is mounted on the at least one assembling portion. The vibrating portion is spaced apart from the casing via the two damping portions mounted on the at least two assembling protrusions, respectively, and via the at least two assembling protrusions at least partially located in the two damping spaces, respectively.

Another embodiment of the present disclosure provides a damper configured to be disposed on a speaker of an electronic device, and including two damping portions and a connecting portion. The two damping portions are configured to be mounted on a casing of the electronic device. Each of the two damping portions has an inner curved surface. The inner curved surface surrounds and forms a damping space. The two damping spaces are configured to accommodate at least a part of the casing of the electronic device. Two opposite ends of the connecting portion are connected to the two damping portions. The speaker is configured to be spaced apart from the casing of the electronic device via the connecting portion mounted on the speaker.

According to the electronic device and the damper disclosed by the above embodiments, since the damping space is formed via the inner flat surfaces and inner curved surface of each of the damping portions, the dampers can further absorb the vibration generated by the speaker during operation. Accordingly, the speaker can be prevented from resonating with the casing and generating noise with the casing during operation. Therefore, the performance of the speaker playing the audio can be maintained.

BRIEF DESCRIPTION OF THE DRAWINGS

The present disclosure will become more fully understood from the detailed description given herein below and the accompanying drawings which are given by way of illustration only and thus are not limitative of the present disclosure and wherein.

DETAILED DESCRIPTION

Figure 1:
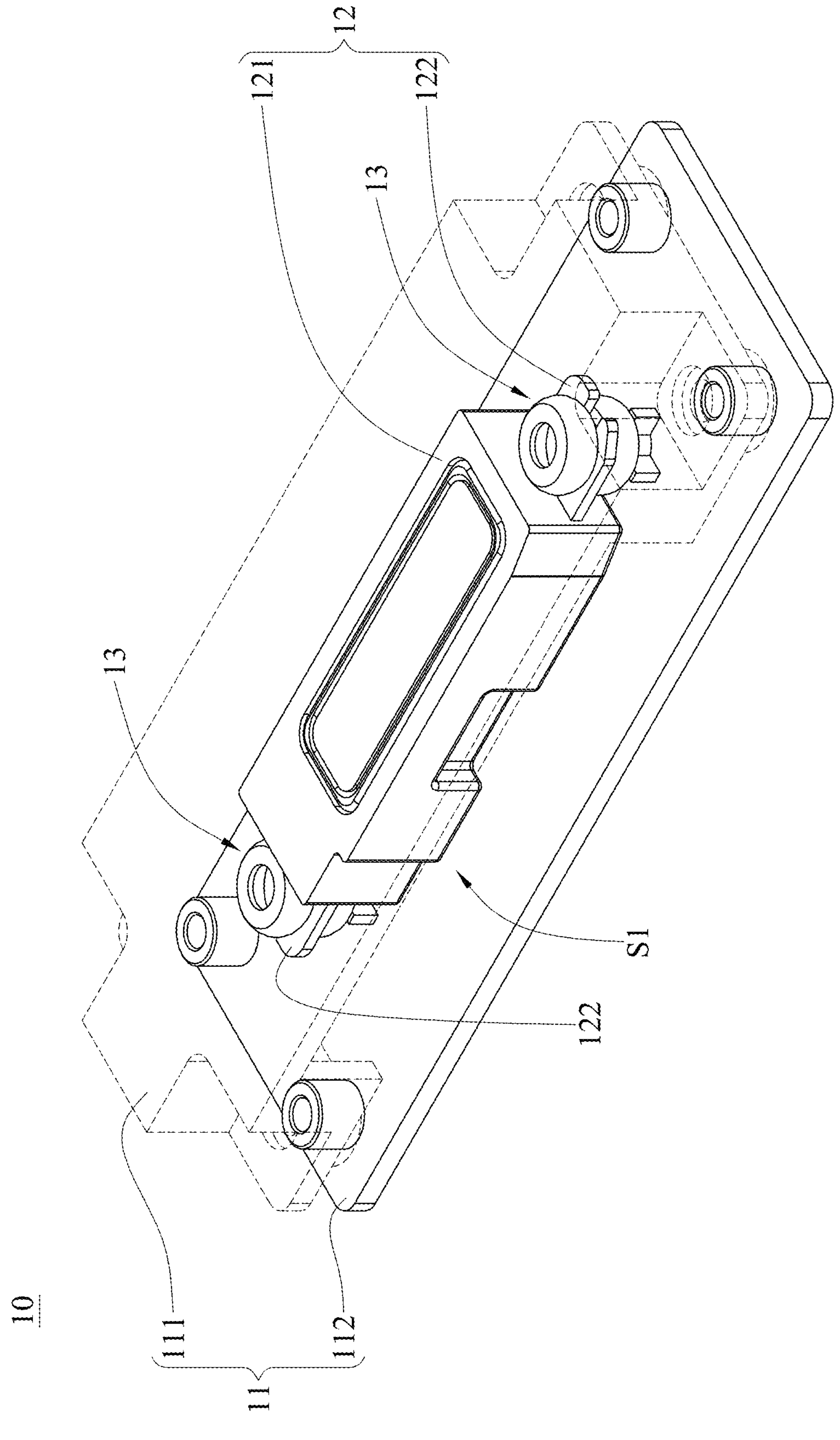
FIG. 1 is a perspective view of an electronic device in accordance with the first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
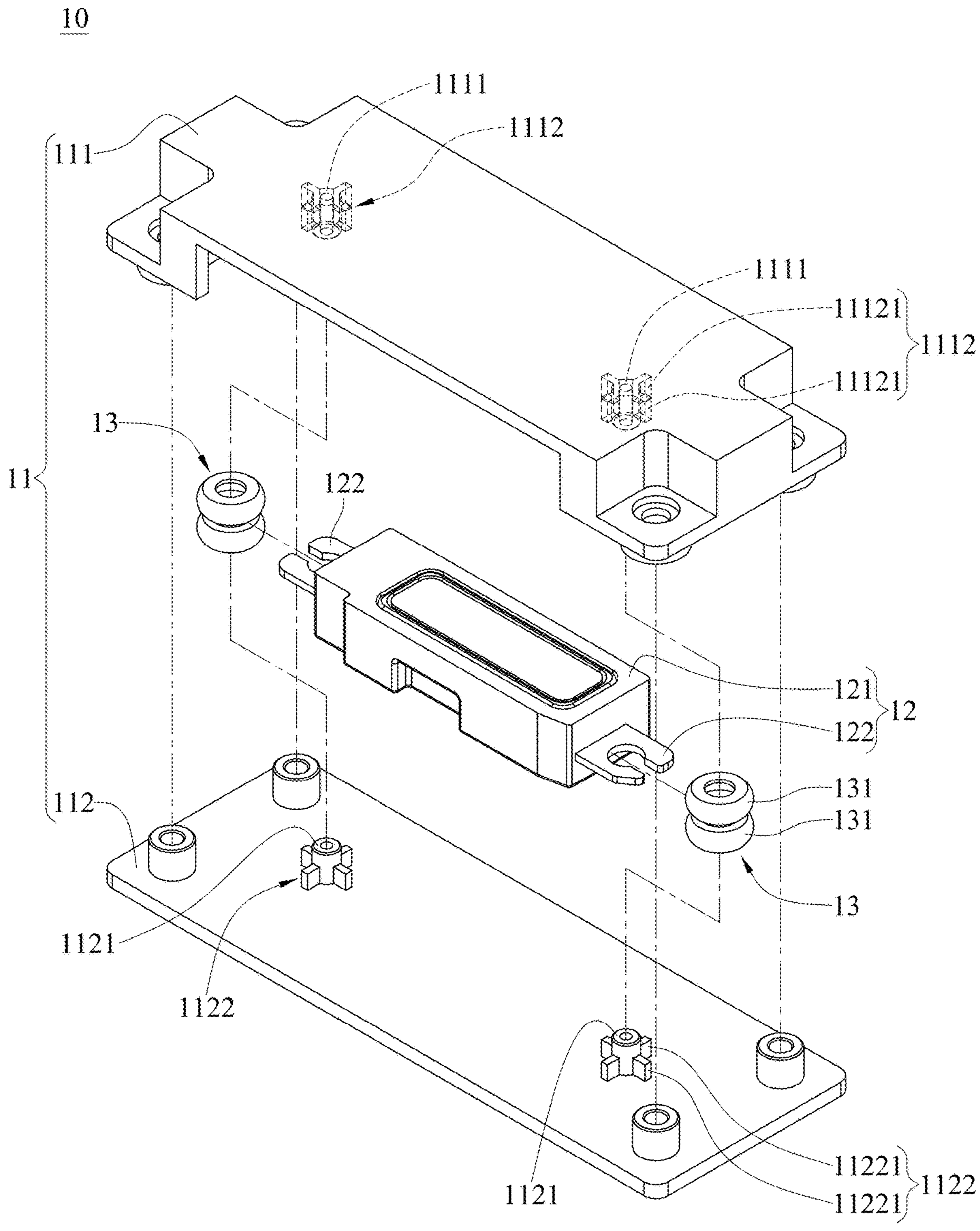
FIG. 2 is an exploded view of the electronic device in FIG. 1.
Figure 3:
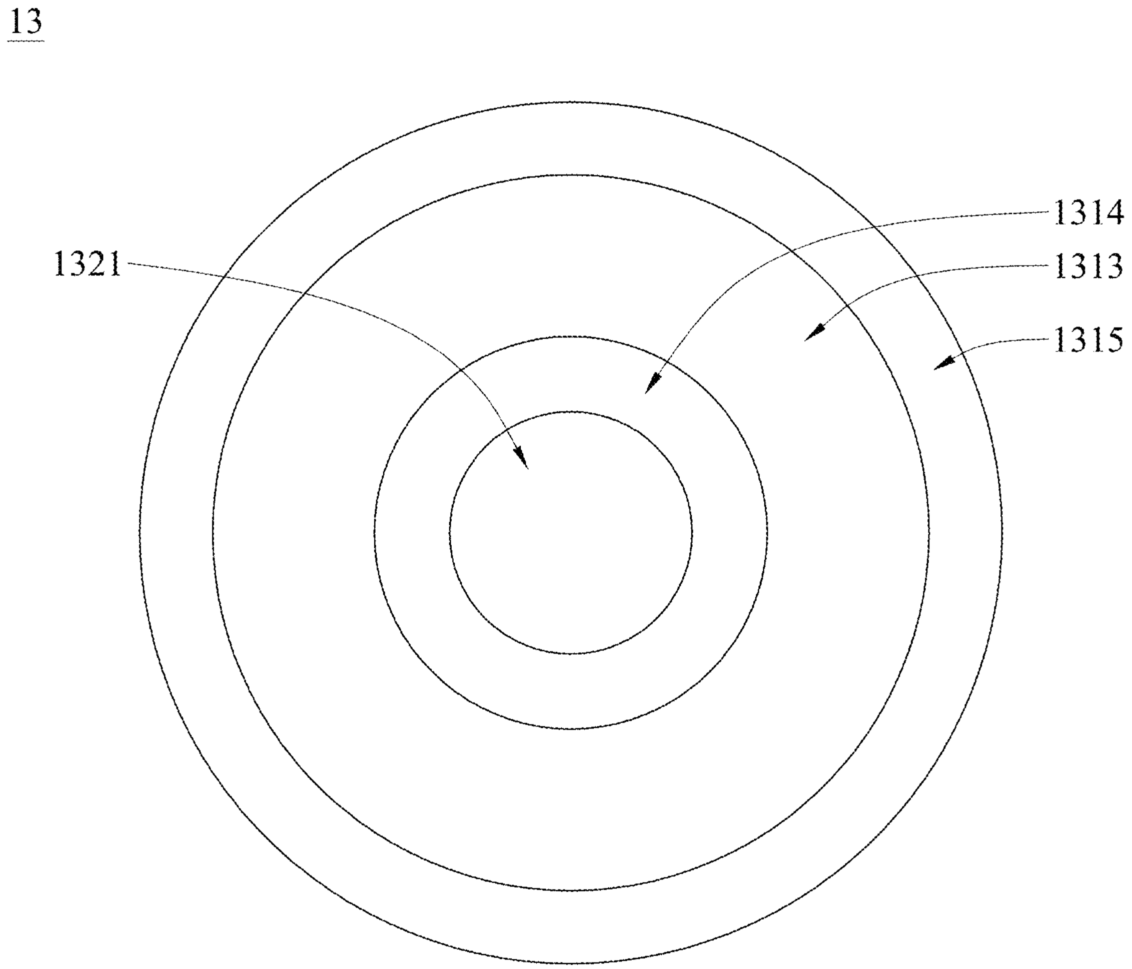
FIG. 3 is a top view of a damper of the electronic device in FIG. 1.
Figure 4:
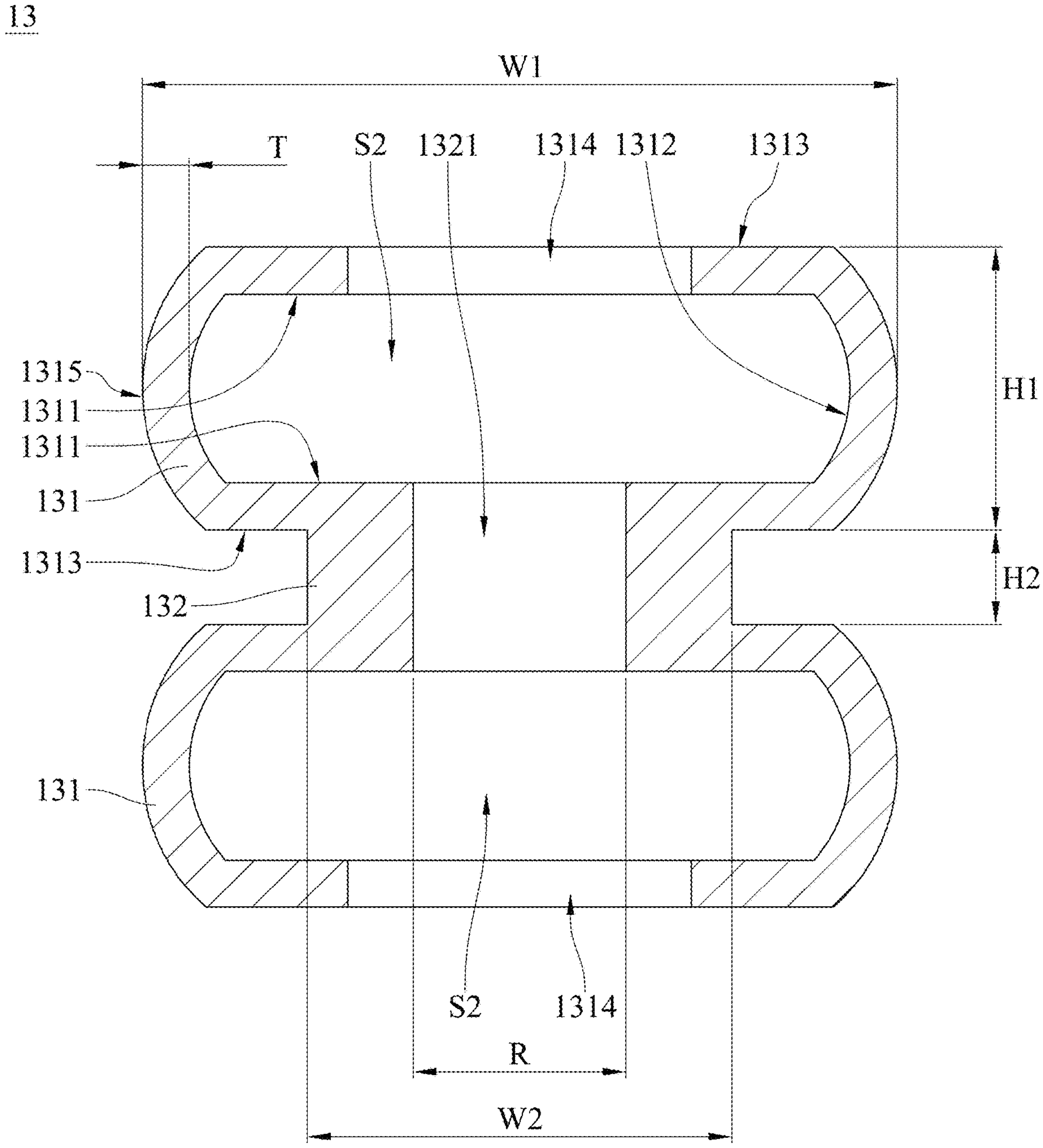
FIG. 4 is a cross-sectional view of the damper of the electronic device in FIG. 1.
Figure 5:
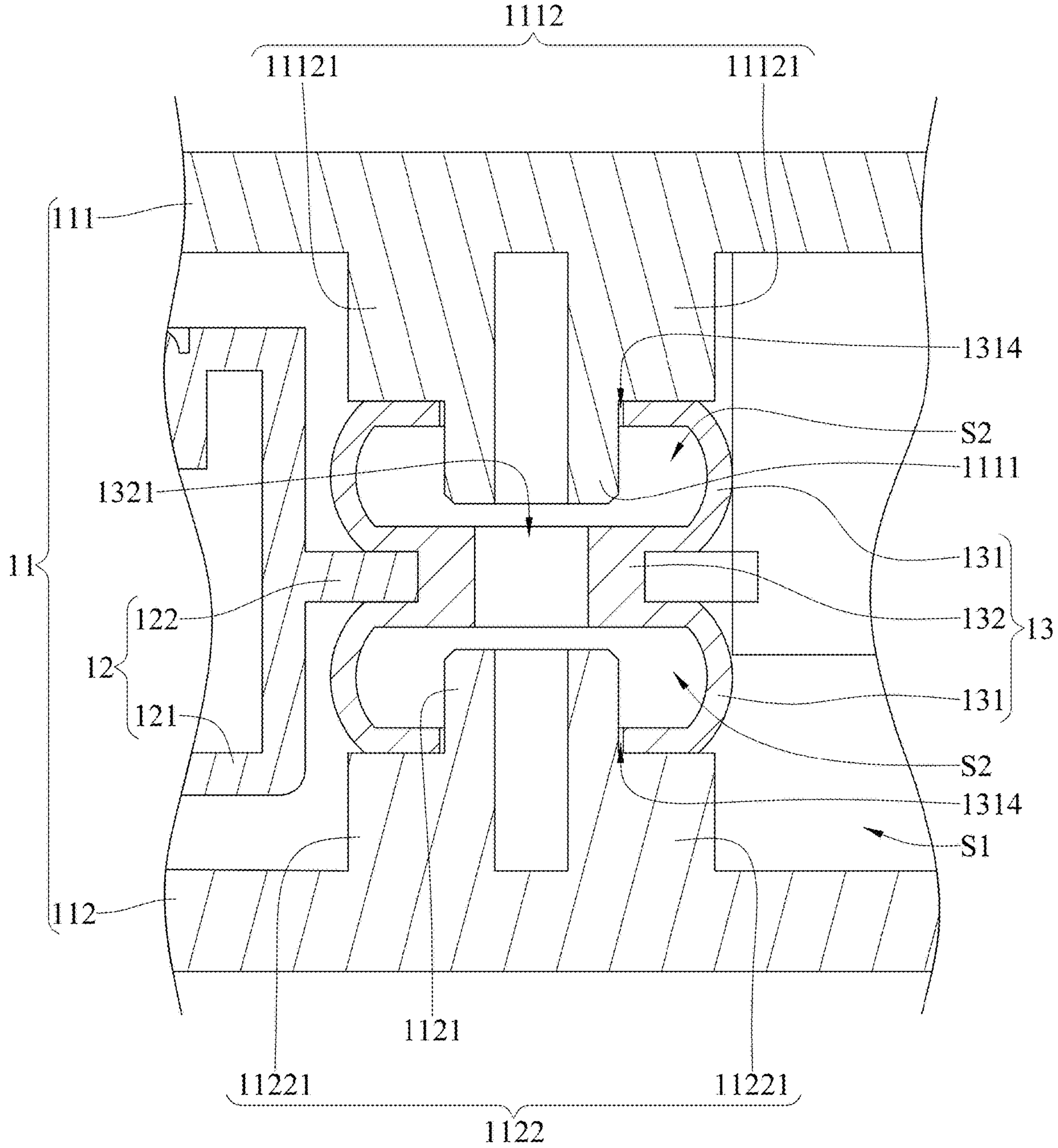
FIG. 5 is a cross-sectional view of the electronic device in FIG. 1.

Please refer to FIG. 1 to FIG. 5, where FIG. 1 is a perspective view of an electronic device 10 in accordance with the first embodiment of the present disclosure, FIG. 2 is an exploded view of the electronic device 10 in FIG. 1, FIG. 3 is a top view of a damper 13 of the electronic device 10 in FIG. 1, FIG. 4 is a cross-sectional view of the damper 13 of the electronic device in FIG. 1, and FIG. 5 is a cross-sectional view of the electronic device 10 in FIG. 1.

In this embodiment, the electronic device 10 is, for example, a laptop or a handheld game console, but the present disclosure is not limit thereto. The electronic device 10 includes a casing 11, a speaker 12 and a plurality of dampers 13. The casing 11 includes a first portion 111 and a second portion 112. The first portion 111 is, for example, a top plate with keyboard of the laptop. That is, the first portion 111 is, for example, a C cover of the laptop. The second portion 112 is, for example, a bottom plate. That is, the second portion 112 is, for example, a D cover of the laptop. The first portion 111 is connected to the second portion 112. The first portion 111 and the second portion 112 together surround and form an accommodating space S1. The first portion 111 has a plurality of assembling protrusions 1111, and the second portion 112 has a plurality of assembling protrusions 1121. The assembling protrusions 1111 of the first portion 111 and the assembling protrusions 1121 of the second portion 112 are located opposite to each other, respectively, and are located in the accommodating space S1. The assembling protrusions 1111 and 1121 are, for example, solid protrusions.

The speaker 12 is located in the accommodating space S1, and includes a vibrating portion 121 and a plurality of assembling portions 122. The assembling portions 122 are connected to the vibrating portion 121. The dampers 13 are, for example, made of flexible materials such as rubber or silicon. Each of the dampers 13 includes two damping portions 131 and a connecting portion 132. Each of the damping portions 131 is, for example, approximately spherical. The dampers 13 can absorb the vibration generated in the vertical direction by the speaker 12 via the approximately spherical damping portions 131.

Each of the damping portions 131 has two inner flat surfaces 1311, an inner curved surface 1312, two outer flat surfaces 1313 and an assembling hole 1314. The two inner flat surfaces 1311 are connected to two opposite sides of the inner curved surface 1312, respectively, and face to each other. The inner flat surfaces 1311 and the inner curved surface 1312 together surround and form the damping space S2. The outer flat surfaces 1313 face away from the inner flat surfaces 1311, respectively. The assembling hole 1314 extends from one of the outer flat surfaces 1313 to the inner flat surface 1311 facing away therefrom.

Two opposite ends of the connecting portion 132 are connected to two sides of the two damping portions 131 located away from the two assembling holes 1314, respectively. The connecting portion 132 is mounted on the assembling portion 122. The damping portions 131 are mounted on the assembling protrusions 1111 and 1121 via the assembling holes 1314, respectively. The assembling protrusions 1111 and 1121 are at least partially located in the two damping spaces S2, respectively. Accordingly, the vibrating portion 121 is spaced apart from the casing 11. The two assembling holes 1314 and the assembling protrusions 1111 and 1121 are designed, for example, as 0 to 0. The so-called "designed as 0 to 0" refers that the sizes of the two assembling holes 1314 and the sizes of the assembling protrusions 1111 and 1121 are substantially the same. The so-called "substantially the same" refers to "identical" or "similar".

The connecting portion 132 has a connecting channel 1321. The damping spaces S2 are connected to each other via the connecting channel 1321. A width of each of the damping spaces S2 is greater than a width of the connecting channel 1321. The dampers 13 can absorb the vibration generated in the horizontal direction by the speaker 12 via the damping spaces S2 and the connecting channel 1321.

In this embodiment, since the damping space S2 is formed via the inner flat surfaces 1311 and inner curved surface 1312 of each of the damping portions 131, the dampers 13 can further absorb the vibration generated by the speaker 12 during operation. Accordingly, the speaker 12 can be prevented from resonating with the casing 11 and generating noise with the casing 11 during operation. Therefore, the performance of the speaker 12 playing the audio can be maintained.

Furthermore, the dampers 13 can absorb the vibration generated in the vertical direction by the speaker 12 via the approximately spherical damping portions 131, and can absorb the vibration generated in the horizontal direction by the speaker 12 via the damping spaces S2 and the connecting channel 1321. Accordingly, the damping performance of the dampers 13 on the speaker 12 can be improved.

In this embodiment, the first portion 111 may have a plurality of contacting portions 1112, and the second portion 112 may have a plurality of contacting portions 1122. Each of the contacting portions 1112 includes a plurality of contacting protrusions 11121, and each of the contacting portions 1122 includes a plurality of contacting protrusions 11221. The contacting protrusions 11121 surround the assembling protrusions 1111, and the contacting protrusions 11221 surround the assembling protrusions 1121. In detail, the contacting protrusions 11121 are arranged, for example, along the periphery of the assembling protrusions 1111, and the contacting protrusions 11121 are spaced apart from each other. The contacting protrusions 11221 are arranged, for example, along the periphery of the assembling protrusions 1121, and the contacting protrusions 11221 are spaced apart from each other. For example, the contacting protrusions 11121 and 11221 are arranged in a cross shape. The damping portions 131 contact the contacting protrusions 11121 and 11221, respectively.

In this embodiment, a thickness T of each of the dampers 13 is, for example, less than or equal to 0.5 millimeters, and a Shore hardness of the each of the dampers 13 is, for example, less than or equal to 30, but the present disclosure is not limit thereto. In other embodiment, the thickness of each of the dampers may be, for example, greater than or equal to 0.3 millimeters, and less than or equal to 0.5 millimeters. The Shore hardness of the each of the dampers may be, for example, less than or equal to 20. Accordingly, the damping performance of the dampers 13 can be further improved.

In this embodiment, a width W1 of each of the damping portions 131 is, for example, 8 millimeters, and a height H1 of each of the damping portions 131 is, for example, 3 millimeters. In addition, a width W2 of the connecting portion 132 is, for example, 5.2 millimeters, and a height H2 of the connecting portion 132 is, for example, 1 millimeter.

In this embodiment, each of the damping portions 131 further has an outer curved surface 1315. Two opposite sides of the outer curved surface 1315 are connected to the two outer flat surfaces 1313, respectively. The outer curved surface 1315 faces away from the inner curved surface 1312.

A ratio of a radius of curvature of the outer curved surface 1315 to a height H1 of the damping portion 131 is, for example, greater than or equal to ⅖ and less than or equal to 1, but the present disclosure is not limit thereto. In other embodiment, the ratio of the radius of curvature of the outer curved surface to the height of the damping portion may be, for example, greater than or equal to ½ and less than or equal to ⅔. Specifically, in this embodiment, the radius of curvature of the outer curved surface 1315 is, for example, greater than or equal to 1 millimeter and less than or equal to 5 millimeters. Accordingly, the damping performance of the damping portions 131 can be further improved.

In this embodiment, a diameter R of the connecting channel 1321 is, for example, greater than or equal to 1 millimeter and less than or equal to 2 millimeters. That is, the width of the connecting channel 1321 is, for example, greater than or equal to 1 millimeter and less than or equal to 2 millimeters, but the present disclosure is not limit thereto. In other embodiment, the diameter of the connecting channel may be, for example, greater than or equal to 1.5 millimeter and less than or equal to 2 millimeters.

In this embodiment, the first portion 111 has the plurality of assembling protrusions 1111, the second portion 112 has the plurality of assembling protrusions 1121, and the electronic device 10 includes the plurality of dampers 13, but the present disclosure is not limit thereto. In other embodiment, the first portion may have one assembling protrusion merely, the second portion may have one assembling protrusion merely, and the electronic device may include one damper merely.

In this embodiment, the casing 11 has the contacting portions 1112 and 1122 for the damping portions 131 to contact, but the present disclosure is not limit thereto. In other embodiment, the casing may not have the contacting portions, and the damping portions contact the casing directly.

In this embodiment, each of the contacting portions 1112 includes the plurality of contacting protrusions 11121, and each of the contacting portions 1122 includes the plurality of contacting protrusions 11221. In addition, the contacting protrusions 11121 and 11221 are arranged in a cross shape, but the present disclosure is not limit thereto. In other embodiment, the contacting protrusions may be arranged, for example, in asterisk shape or in other shapes. On the other hand, each of the contacting portions may include one contacting protrusion merely, and the contacting protrusion is, for example, ring-shaped.

Figure 6:
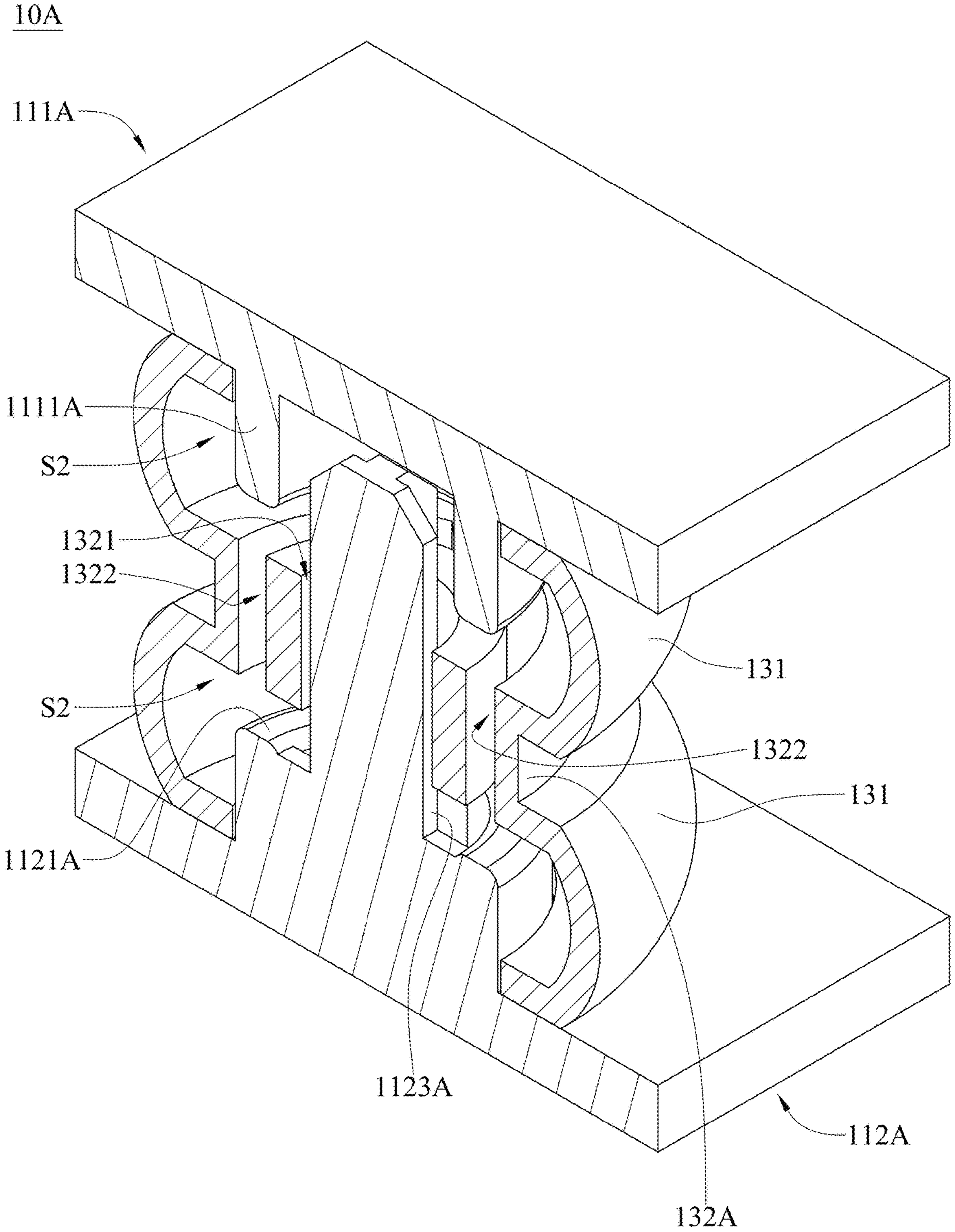
FIG. 6 is a sectional view of an electronic device in accordance with the second embodiment of the present disclosure.
Figure 7:
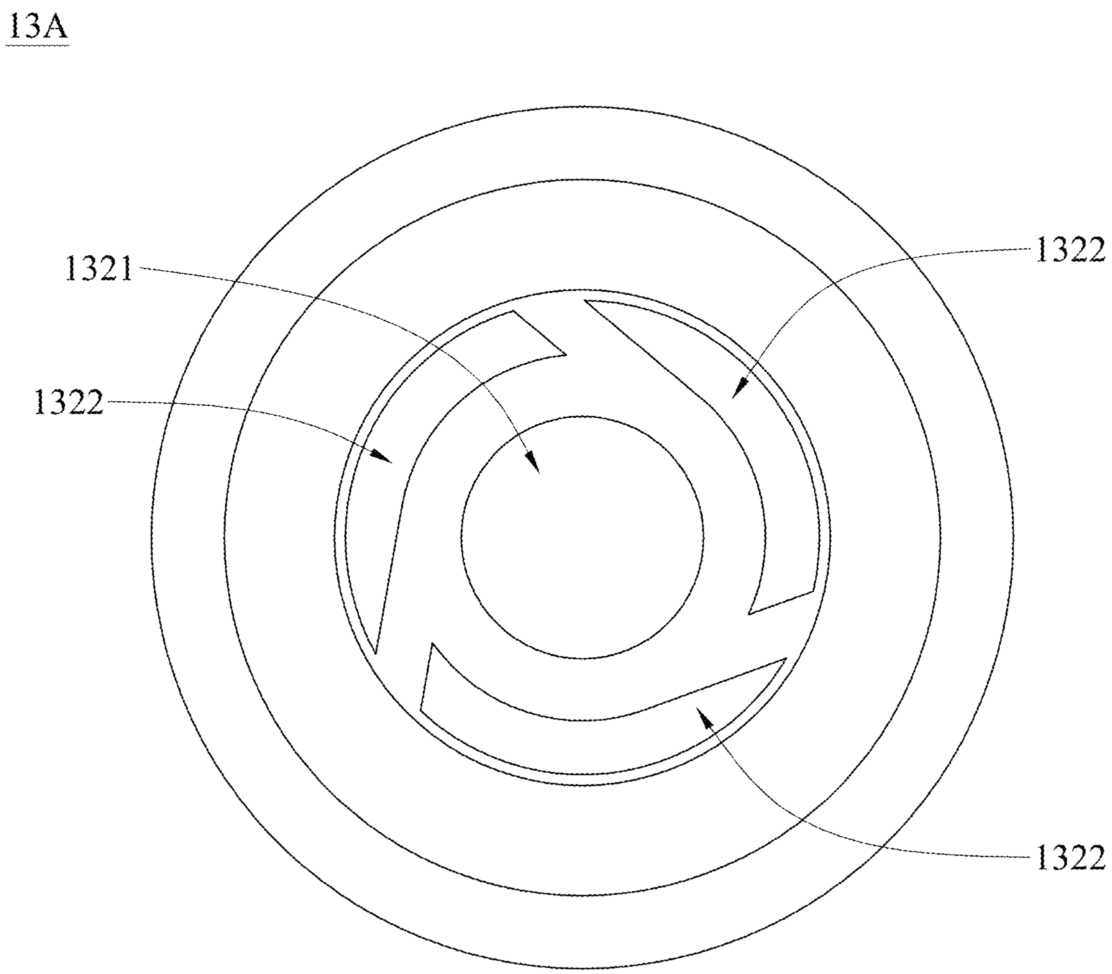
FIG. 7 is a top view of a damper of the electronic device in FIG. 6.

In this embodiment, the connecting portion 132 has the connecting channel 1321 merely, but the present disclosure is not limit thereto. In other embodiment, please refer to FIG. 6 and FIG. 7, where FIG. 6 is a sectional view of an electronic device 10A in accordance with the second embodiment of the present disclosure, and FIG. 7 is a top view of a damper 13A of the electronic device 10A in FIG. 6.

The electronic device 10A of this embodiment is similar to the electronic device 10 of the first embodiment, the main difference between them will be described below, and the same parts between them can be referred to the aforementioned paragraphs with the reference to FIG. 1 to FIG. 5 and will not be repeatedly introduced hereinafter. In this embodiment, the first portion 111A and the second portion 112A do not include the contacting portions, and each of the assembling protrusions 1111A is, for example, recess-shaped. In addition, the second portion 112A further includes a plurality of positioning protrusions 1123A. The positioning protrusions 1123A protrude from the assembling protrusions 1121A, respectively, and each of the positioning protrusions 1123A extends towards the first portion 111A from one of the damping spaces S2 of each of the dampers 13A to another damping space S2 through the connecting channel 1321.

The connecting portion 132A of each of the dampers 13A further has a plurality of curved cavities 1322. The curved cavities 1322 together surround the connecting channel 1321. The two damping spaces S2 are connected to each other via the connecting channel 1321 and the curved cavities 1322. A width of each of the curved cavities 1322, for example, decreases from one end of the curved cavity 1322 to another end of the curved cavity 1322, and width decreasing directions of the curved cavities 1322 are same. Each of the curved cavities 1322 is tangent to the connecting channel 1321. The dampers 13A can further absorb the vibration generated in the horizontal direction by the speaker 12 as described in the first embodiment via the curved cavities 1322.

According to the electronic device and the damper disclosed by the above embodiments, since the damping space is formed via the inner flat surfaces and inner curved surface of each of the damping portions, the dampers can further absorb the vibration generated by the speaker during operation. Accordingly, the speaker can be prevented from resonating with the casing and generating noise with the casing during operation. Therefore, the performance of the speaker playing the audio can be maintained.

Furthermore, the dampers can absorb the vibration generated in the vertical direction by the speaker via the approximately spherical damping portions, and can absorb the vibration generated in the horizontal direction by the speaker via the damping spaces and the connecting channel. Accordingly, the damping performance of the dampers on the speaker can be improved.

It will be apparent to those skilled in the art that various modifications and variations can be made to the present disclosure. It is intended that the specification and examples be considered as exemplary embodiments only, with the scope of the present disclosure being indicated by the following claims.

What is claimed is:

1. An electronic device, comprising:

a casing, having at least two assembling protrusions, wherein the casing surrounds and forms an accommodating space, the at least two assembling protrusions are located opposite to each other, and are located in the accommodating space;

a speaker, located in the accommodating space, wherein the speaker comprises a vibrating portion and at least one assembling portion, the at least one assembling portion is connected to the vibrating portion; and at least one damper, comprising two damping portions and a connecting portion, wherein each of the two damping portions has an inner curved surface, the inner curved surface surrounds and forms a damping space, two opposite ends of the connecting portion are connected to the two damping portions, the connecting portion is mounted on the at least one assembling portion, and the vibrating portion is spaced apart from the casing via the two damping portions mounted on the at least two assembling protrusions, respectively, and via the at least two assembling protrusions at least partially located in the two damping spaces, respectively.

2. The electronic device according to claim 1, wherein each of the two damping portions further comprises two inner flat surfaces, the two inner flat surfaces are connected to two opposite sides of the inner curved surface, respectively, and face to each other, and the two inner flat surfaces and the inner curved surface together surround and form the damping space.

3. The electronic device according to claim 1, wherein the casing further has at least one contacting portion, the at least one contacting portion comprises a plurality of contacting protrusions, the plurality of contacting protrusions surround the at least two assembling protrusions, respectively, and the two damping portions contact the plurality of contacting protrusions, respectively.

4. The electronic device according to claim 1, wherein the connecting portion has a connecting channel, the two damping spaces are connected to each other via the connecting channel, and a width of each of the two damping spaces is greater than a width of the connecting channel.

5. The electronic device according to claim 4, wherein the connecting portion further has a plurality of curved cavities, the plurality of curved cavities together surround the connecting channel, the two damping spaces are connected to each other via the connecting channel and the plurality of curved cavities, a width of each of the plurality of curved cavities decreases from one end of the curved cavity to another end of the curved cavity, and width decreasing directions of the plurality of curved cavities are same.

6. The electronic device according to claim 4, wherein a diameter of the connecting channel is greater than or equal to 1 millimeter and less than or equal to 2 millimeters.

7. The electronic device according to claim 1, wherein each of the two damping portions further has an outer curved surface, the outer curved surface faces away from the inner curved surface, and a ratio of a radius of curvature of the outer curved surface to a height of the damping portion is greater than or equal to 2/5 and less than or equal to 1.

8. The electronic device according to claim 1, wherein a thickness of the at least one damper is less than or equal to 0.5 millimeters.

9. The electronic device according to claim 1, wherein a Shore hardness of the at least one damper is less than or equal to 30.

10. A damper, configured to be disposed on a speaker of an electronic device, comprising:

two damping portions, configured to be mounted on a casing of the electronic device, wherein each of the two damping portions has an inner curved surface, the inner curved surface surrounds and forms a damping space, and the two damping spaces are configured to accommodate at least a part of the casing of the electronic device; and a connecting portion, wherein two opposite ends of the connecting portion are connected to the two damping portions, the speaker is configured to be spaced apart from the casing of the electronic device via the connecting portion mounted on the speaker, the connecting portion has a connecting channel, the two damping spaces are connected to each other via the connecting channel, and a width of each of the two damping spaces is greater than a width of the connecting channel.

* * * * *